(12) United States Patent
Gonzalez et al.

(10) Patent No.: US 6,749,650 B2
(45) Date of Patent: Jun. 15, 2004

(54) SYSTEM AND METHOD FOR MULTILAYER FABRICATION OF LITHIUM POLYMER BATTERIES AND CELLS

(75) Inventors: Jose E Gonzalez, Fishers, IN (US); Steven D Cochran, Fishers, IN (US)

(73) Assignee: Delphi Technologies Inc., Troy, MI (US)

( * ) Notice: Subject to any disclaimer, the term of this patent is extended or adjusted under 35 U.S.C. 154(b) by 200 days.

(21) Appl. No.: 09/912,987

(22) Filed: Jul. 25, 2001

(65) Prior Publication Data

US 2002/0170168 A1 Nov. 21, 2002

Related U.S. Application Data

(63) Continuation-in-part of application No. 09/862,388, filed on May 21, 2001.

(51) Int. Cl.⁷ .................................................. H01M 4/04
(52) U.S. Cl. ...................... 29/623.5; 29/623.1; 429/129
(58) Field of Search ................................. 429/127, 129; 29/623.5

(56) References Cited

U.S. PATENT DOCUMENTS

| | | | | |
|---|---|---|---|---|
| 5,196,279 A | | 3/1993 | Tarascon | 429/194 |
| 5,296,318 A | | 3/1994 | Gozdz et al. | 429/192 |
| 5,358,658 A | | 10/1994 | Pradhan et al. | 429/192 |
| 5,582,931 A | * | 12/1996 | Kawakami | 429/127 |
| 5,587,257 A | | 12/1996 | Tibbetts et al. | 429/218 |
| 5,604,057 A | | 2/1997 | Nazri | 429/224 |
| 5,674,644 A | | 10/1997 | Nazri | 429/224 |
| 5,743,921 A | | 4/1998 | Nazri et al. | 29/623.5 |
| 5,871,865 A | | 2/1999 | Barker et al. | 429/162 |
| 5,961,671 A | | 10/1999 | Guindy et al. | 29/623.1 |
| 6,010,653 A | * | 1/2000 | Menon | 264/105 |
| 6,063,519 A | | 5/2000 | Barker et al. | 429/161 |
| 6,180,281 B1 | * | 1/2001 | Schneider | 429/129 |
| 6,183,912 B1 | | 2/2001 | Nazri | |
| 6,291,097 B1 | | 9/2001 | Barker et al. | |
| 6,316,142 B1 | * | 11/2001 | Delnick | 429/217 |
| 6,406,815 B1 | | 6/2002 | Sandberg et al. | |
| 6,413,668 B1 | | 7/2002 | Sandberg et al. | |
| 6,419,712 B1 | | 7/2002 | Haverstick | |
| 6,617,078 B1 | | 9/2003 | Chia et al. | |

FOREIGN PATENT DOCUMENTS

| | | | | |
|---|---|---|---|---|
| US | 5158843 | * | 10/1992 | 429/218 |
| US | 5587253 | * | 12/1996 | 429/192 |

* cited by examiner

Primary Examiner—Mark Ruthkosky
(74) Attorney, Agent, or Firm—Jimmy L. Funke

(57) ABSTRACT

Method of making Li-intercalateable electrodes for a lithium-ion battery by applying a first film onto a first face of an electrically conductive grid, which film comprises a plurality of Li-intercalateable particles dispersed throughout a mixture of a polymeric binder and a plasticizer for the binder. Thereafter, a film-forming slurry having the same composition as the first film, plus a solvent therefor, is applied to a second face of the grid opposing the first face so as to provide a second film and such that the solvent in the slurry dissolves at least a portion of the first film and promotes solvent bonding of the films with the grid embedded therein. A polymeric backing film defining a separator is used as a manufacturing process aid, thereby eliminating the step of using a carrier film onto which the electrodes are fabricated and stripping off the carrier and discarding the same.

10 Claims, 5 Drawing Sheets

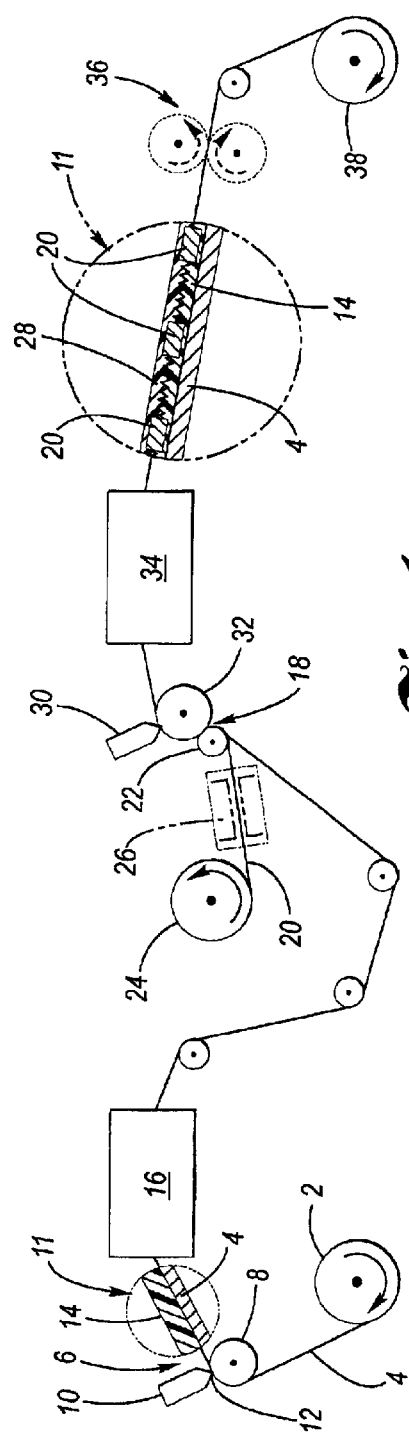
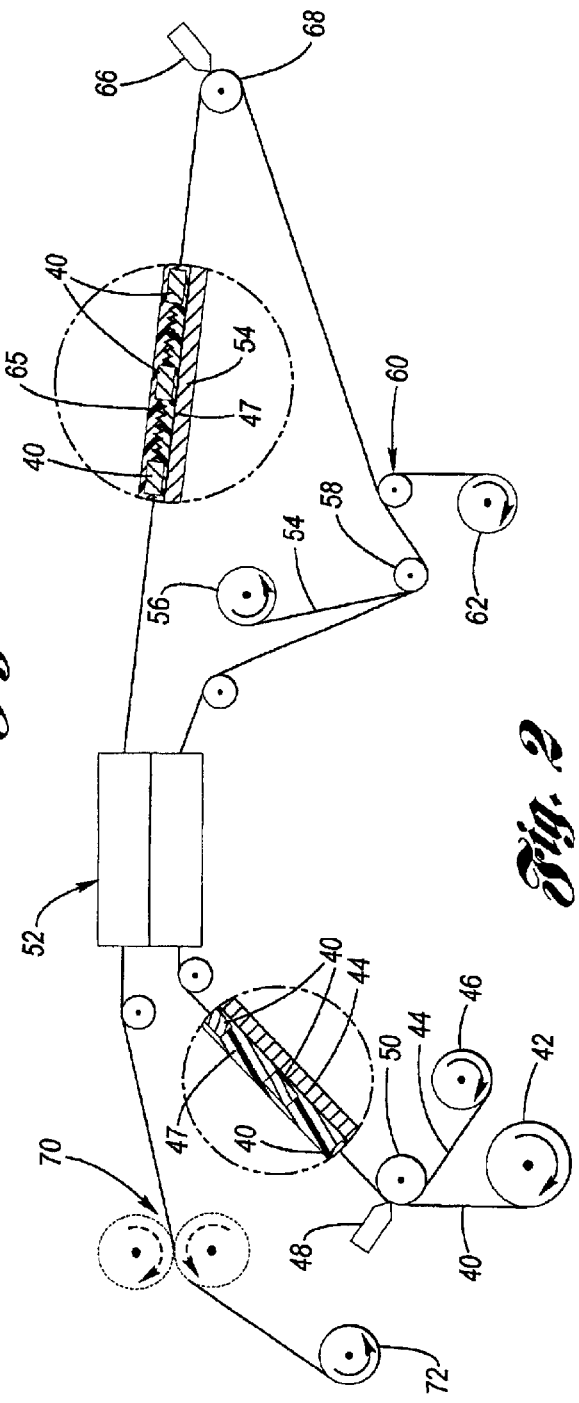
Fig. 1
Fig. 2

SYSTEM AND METHOD FOR MULTILAYER FABRICATION OF LITHIUM POLYMER BATTERIES AND CELLS

RELATED APPLICATIONS

This application is a continuation-in-part of U.S. application Ser. No. 09/862,388 filed May 21, 2001, which is copending, hereby incorporated by reference in its entirety.

BACKGROUND OF THE INVENTION

1. Technical Field

This invention relates to lithium ion batteries, and more particularly to a method of making electrodes (i.e., anodes and cathodes) therefor.

2. Description of the Related Art

Lithium ion batteries of the so-called "rocking chair" type are known in the art and comprise a lithium-intercalateable anode, a lithium-intercalateable cathode and a lithium-ion-conductive electrolyte sandwiched therebetween, as seen generally by reference to U.S. Pat. No. 5,196,279 to Tarascon. One particular variant of such battery is the so-called "lithium polymer" battery wherein (1) the electrodes (i.e. anode and cathode) contain lithium-intercalateable particles bound together in a porous polymer matrix, impregnated with electrolyte, and (2) a porous polymeric membrane/separator, impregnated with electrolyte, lies interjacent the electrodes.

It is known to fabricate lithium-polymer cells by sandwiching a thin dry film of the separator/membrane material between a thin dry film of anode material and a thin dry film of cathode material and forming a laminate thereof by bonding the several films together under heat and pressure. Current collecting grids may be pressed into the anode and cathode materials at the same time or in a separate operation. However, this approach involves many steps, which increase fabrication cost and complexity. Moreover, achieving consistent and enduring lamination has been an ongoing problem in the manufacture of lithium polymer batteries. Delamination of one or more layers may result in an inoperative battery.

Other approaches have been taken in the art. U.S. Pat. No. 5,296,318 to Gozdz et al. disclose a process for making a lithium polymer cell by a process wherein (1) a first electrode film is cast wet and dried on a first current collector defined by aluminum collector foil, (2) a separator/membrane film is cast wet and dried atop the first electrode film, (3) a second electrode film is cast wet and dried atop the separator/membrane, and (4) a second current collector applied to the second electrode film. However, the approach is not effective for mass production inasmuch as the process produces incomplete and/or unenduring contact between layers and components thereof. This is more particularly true for the above-mentioned lamination approach. The foregoing results in lower production efficiency, increased scrap rate (due to higher than acceptable resistances), and, accordingly, higher costs.

In copending application Ser. No. 09/862,388, filed May 21, 2001, assigned to the common assignee of the present invention, a process is disclosed for fabricating composite electrodes that involves the use of a carrier layer upon which an electrode is formed. Copending application Ser. No. 09/862,388 further discloses, in one embodiment, that the carrier layer is stripped off to separate the electrode therefrom. It would be desirable to avoid having to strip off the carrier layer.

There is therefore a need to provide an improved process for fabricating composite electrodes, including multilayer structures for use in lithium ion batteries or cells that minimizes or eliminates one or more of the problems as set forth above.

SUMMARY OF THE INVENTION

Manufacturing complexity, cost, and scrap rate can be reduced, production rates increased, and better contact between the grid and the electrode material achieved by a process according to the present invention.

The invention involves using a separator as a backing film in the coating process. Since the separator is used in cells and batteries, it can be retained, unlike the carrier disclosed in copending application Ser. No. 09/862,388, which is removed and discarded. This improvement allows attachment of the separator at an earlier stage in the overall process, and further, eliminates steps. In a preferred embodiment, the separator is a polymeric backing film. The separator performs its conventional function as well as a new function, namely, that of a carrier or backing film.

BRIEF DESCRIPTION OF THE DRAWINGS

The present invention will now be described by way of example, with reference to the accompanying drawings, in which:

FIG. 1 is a schematic of one embodiment of a process according to the present invention;

FIG. 2 is a schematic of another embodiment of a process according to the present invention;

DETAILED DESCRIPTION OF THE PREFERRED EMBODIMENTS

Figure 3:
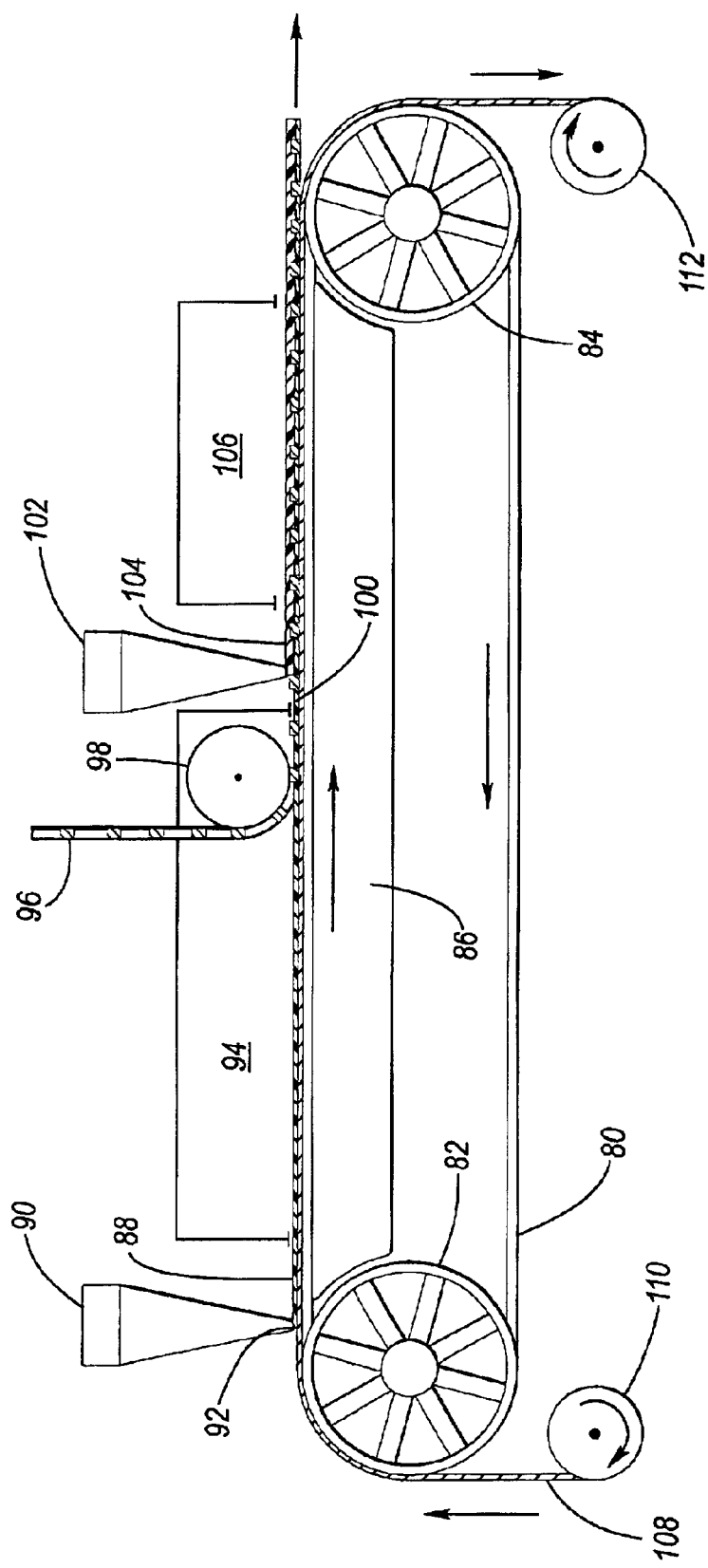
FIG. 3 is a schematic of yet another embodiment of process according to the present invention.

FIG. 1 schematically depicts one embodiment of a continuous process for making lithium-intercalateable electrodes according to the present invention. Moving from left to right, a reel 2 dispenses a length of carrier strip 4 to a coating station 6. The carrier strip 4 may comprise substantially any material which (1) does not stick firmly to the lithium-intercalateable, film-forming slurry to be subsequently applied thereto, and (2) has sufficient tensile strength to withstand being pulled through the system without deformation and sufficient rigidity to withstand the shrinkage forces form drying. Disposable smooth-faced material (e.g., Mylar) having a thickness between about 80 μm, and about 150 μm is particularly suitable for this purpose, as it is tough, inexpensive, and readily separable from the electrode. Alternatively, a reusable carrier strip, e.g., stainless steel, aluminum, plastic or the like, may be used in lieu of a disposable carrier strip. At the coating station 6, the carrier strip 4 passes over a backing roller 8 while a thick, almost pasty, slurry of lithium-intercalateable, film-forming material is spread onto the strip 4 from a dispenser 10 to form a composite strip 11. The dispenser 10 will preferably comprise a reservoir for retaining the film-forming slurry and have a narrow slotted die (not shown) at the mouth 12 thereof adjacent the strip 4. Pressure applied to the film-forming slurry in the reservoir causes the slurry to flow out of the die onto the carrier strip 4 where it spreads as a ribbon-like first film 14 on the carrier 4. A doctor blade or comma bar type device (not shown) may be used downstream of the dispenser 10 to spread and level the film 14 to a desired, controlled thickness. Other techniques, well know to those skilled in the art, for continuously forming thin films of material from slurries thereof may also be used.

The slurry of electrode material (1) comprises a mixture of any suitable combination of the intercalateable particles, binders, plasticizers, solvents and conductive fillers mentioned above, or the like, (2) will have a viscosity that varies form about 1000 centipoise (cp) to about 13,000 cp, and (3) will be spread to a wet thickness varying between about 50 $\mu$m to about 1200 $\mu$m. Preferably, the material will have a viscosity of about 1000 cp to about 6000 cp and spread to a thickness varying between about 25 $\mu$m to about 700 $\mu$m when a slotted die, doctor blade, comma bar or other coating systems are used to spread the film onto the carrier 4.

In the case of the negative electrodes (i.e., the anode), the intercalateable particles comprise suitable carbons and graphites known to those skilled in the art. In some cases, conductive carbon may be added to the anode to enhance the electrical conductivity of the film. In the case of the positive electrode (i.e., the cathode), the lithium-intercalateable particles comprise any of a number of materials known to those skilled in the art including certain lithium-containing oxides of manganese, cobalt, nickel, aluminum, titanium, vanadium, and others and mixtures thereof. Conductive carbon is typically added to the cathode mix to enhance the electrical conductivity thereof.

A variety of polymers may be used as the binder for the lithium-intercalateable particles provided that the binder is compatible with (e.g., will not degrade in) the operating environment of the battery. Known polymers for this purpose include certain polyolefins, fluorocarbons (e.g., polytetrafluoroethylene), polyvinylidene fluoride, EPDM, acrylates, urethanes and copolymers of the aforesaid. One binder is a copolymer comprising about 75% to about 92%, by weight, polyvinylidene fluoride (PVdF) and about 8% to about 25% hexafluoropropylene (HFP). Such binder is commercially available from the Atofina North America company under the trade name Kynar LBG or Kynar Power Flex. The binder is mixed with any of a variety of organic plasticizers, the selection of which will depend on the composition of the binder chosen. Suitable plasticizers for the aforesaid PVdF-HFP copolymer binder include propylene carbonate (PC), ethylene carbonate (EC), dibutyl phthalate (DBP), dimethyl phthalate, diethyl phthalate and tris butoxyethyl phosphate. The plasticizer will eventually be leached out of the film so as to leave a microporous polymer matrix, which is subsequently impregnated with electrolyte. In an alternate embodiment, plasticizer is omitted and the mix is cast, which leaves a microporous matrix on the film.

The binder and plasticizer are dissolved in sufficient solvent to form a viscous/pasty slurry of solvent, binder, plasticizer and intercalateable particles. The choice of solvent will depend on the composition of the binder. For PVdF or PVdF:HFP copolymers, methyl ethyl ketone, dimethyl foramide, dimethyl acetamide, acetone or others (e.g., may be environmentally friendly) and combinations thereof are suitable, with acetone being preferred.

The anode forming slurry may comprise, by weight, (1) about 20% to about 30% lithium-intercalateable graphite particles (i.e., ca. 1 $\mu$m to ca. 20 $\mu$m), (2) about 5% to about 10% binder (preferably PVd:HFP), (3) about 0.10% to about 14% plasticizer (preferably DBP, PC or others known in the art), (4) less than about 2% by weight conductive carbon particles, and (5) the balance solvent (preferably acetone). Preferably, an anode mix comprises, on a weight basis, about 25% carbon or graphite particles, about 6.8% 88:12 PVdF-:HFP binder, about 8.9% dibutylphthalate (DBP) plasticizer, about 0.9% conductive carbon, and the balance acetone.

The cathode forming slurry may comprise, by weight, (1) about 28% to about 35% LiNiCoO family particles as the lithium-intercalateable material, (2) about 4% to about 5% binder (preferably PVd:HFP), (3) about 0.1% to about 9% plasticizer (preferably DBP, PC or other), (4) about 2% to about 3% conductive carbon particles, and (5) the balance solvent (preferably acetone). Preferably, a cathode mix comprises, on a weight basis, about 34.7% $Li_{1+x}MN_2O_4$ or LiNiCoAlO or LiCoO family particles (<53 $\mu$m), about 4.4% PVdF:HFP binder, about 6.9% DBP plasticizer, about 2.5% conductive carbon, and the balance acetone.

After the first film 14 is spread onto the carrier 4, the composite strip 11, thusly formed, passes through a drier 16 for removing the solvent from the binder/plasticizer. The drier 16 may take the form of a vacuum chamber, a forced air drier, a low temperature oven or combinations thereof for accelerating the evaporation of the solvent from the first film 14. The drier 16 will preferably comprise an oven which also heats the first film 14 preparatory to having a current collecting grid 20 pressed thereinto downstream of the drier 16. The drying temperature of the process ranges between about 20° F. to 130° F.; the tension of the strip between about 0.1 lbs. to 15 lbs.; and the speed at which the strip is moved between about 1 fpm to 15 fpm.

Following drying of the first film 14, the composite 11 advances to a station 18 where an electrically conductive grid 20 is pressed into the first film 14 by roller 22 as the composite 11 passes over roller 32. The grid 20 will preferably comprise a thin (i.e., about 25 $\mu$m to about 75 $\mu$m) perforated or expanded metallic structure (i.e., Al for the positive electrode—cathodes, and Cu for the negative electrode—anodes) dispensed as a strip from a reel 24 therefor. An optional heating station 26 (shown in phantom) may be included to preheat the grid 20 prior to pressing it into the first film 14 at station 18. The heating station may comprise an oven, and will preferably heat the grid to a temperature of about 75° F. to about 130° F. Optionally, the pressure roll 22 may be heated in addition to, or in lieu of, the grid 20 being preheated.

After the grid 20 has been pressed into the first film 14, a film-forming slurry 28 is spread atop the first film 14 and grid 20 from the dispenser 30 as the composite strip passes over the roller 32. The composition of the slurry 28 (sans solvent) is the same as that of the dried first film 14, and the solvent from the slurry 28 dissolves at least some of the dried first film 14 sufficiently to cause the two films to coalesce and bond together so as to provide an indistinguishable parting line therebetween. At the same time, the film material flows over and about the grid 20 providing intimate interfacial contact and enhanced electrical contact therebetween. Alternatively, the slurry for forming the second film 28 may use a different solvent than that used for the first film so long as it is a suitable solvent for the binders in both films 14 and 28. After the second film 28 has been spread atop the first film 14, and coalesced therewith, the composite strip 11 passes through a drier 34 for drying the strip by removing the solvent therefrom. Like drier 16, the drier 34 may take the form of a vacuum chamber, a forced air dryer, a low temperature oven or combinations thereof and serves to accelerate evaporation of the solvent from electrode. The drier 34 will preferably comprise an oven, the temperature of which and residence time therein, is such as to slowly dry the composite 11 so as to avoid flash vaporization of the solvent within the films which can cause "blowholes" and macropores to form therein, as well as cause some localized separation of the electrode material from the grid.

Following drying in the drier 34, the composite 11 may optionally be calendered or squeezed between rollers (shown in phantom at a station 36) to (1) promote even better contact with the grid, (2) depress any errant intercalateable particles that might be projecting about the surface down into the film, and (3) press the films to a controlled final thickness and porosity. Calendering/rolling may be preformed at ambient or superambient temperatures (e.g., about 90° F. to about 140° F.) at pressures of about 5 to about 100 (preferably about 15 to 40) pounds per linear inch (pli).

Following drying, and calendering/rolling at station 36 is done, the composite strip 11 may either (1) be fed directly to a cell assembly station where it is laminated with the separator/membrane and opposite polarity electrode, or (2) as shown in FIG. 1, will be coiled up on reel 38 for subsequent uncoiling and feeding to a cell assembly station at a later time. The temporary carrier 4 remains with the composite 11 during wind up and unwinding on/off the reel 38, but is removed therefrom just prior to the electrode's being laminated to a separator/membrane and counterelectrode during the cell assembly operation (not shown). The temporary carrier 4 may also remain with the cathodes during the cell assembly operation (i.e., laminating of electrodes to separator) to keep the materials from sticking to the laminating equipment (e.g., rollers) and to control the dimensions of the film. Thereafter, the temporary carrier may be peeled off of the final laminate.

FIG. 2 schematically depicts another embodiment of the invention using the same electrode slurries as described in connection with FIG. 1, but wherein a strip of grid material 40, uncoiled from a reel 42, is laid atop a strip of carrier material 44 uncoiled from a reel 46 as both pass over a roller 50. A first film-forming slurry 47 of lithium-intercalateable material is dispensed onto the carrier 44 and grid 40 strip from a dispenser 48 (like that described about for FIG. 1) as it passes over the roller 50. Thereafter, the thusly formed composite strip (i.e., carrier 44, grid 40, and film 47) passes in a first direction through a dryer 52 (i.e., like that described about for FIG. 1) to dry the film 47. Subsequently, a second carrier strip 54, (i.e., like the strip 44), is uncoiled from a reel 56 and laid atop the film 47 as it passes over roller 58. Shortly thereafter, the first carrier strip 44 is peeled away from the composite strip at station 60 and wound up on reel 62 for disposal or reuse as appropriate to the particular carrier material being used.

Following application of the second carrier material 54 to the composite strip, a second film 64 is dispensed atop the first film 47 and grid 40 as a slurry exiting from a dispenser 66 (like that described in FIG. 1) as the composite strip passes over the roller 68. The composition of the second film 64 is the same as that of the first film 47, and the solvent from slurry that forms the second film dissolves at least some of the dried first film 47 sufficiently to cause the two films to coalesce and bond together so as to provide an indistinguishable parting line therebetweeen, and in so doing encapsulate the grid 40 therein.

After the second film 64 has been spread atop the first film 47 and grid 40, the composite strip passes back through the drier 52 to finish drying the composite strip by evaporating and removing the solvent from the binder/plasticizer. Thereafter, the composite strip may optionally be calendered or rolled (shown in phantom at a station 70) as discussed above in connection with FIG. 1.

Following drying in dryer 52, and, if done, calendering/rolling, the composite strip may either be fed directly to a cell assembly station (not shown) where it is laminated with a separator/membrane and an opposite polarity counterelectrode, or, as shown in FIG. 2, will be coiled up on reel 72 for subsequent uncoiling and feeding to a cell assembly station at a later time.

FIG. 3 schematically depicts still another embodiment of the invention using the same film-forming slurries as described above, but wherein a continuous belt (e.g., aluminum or stainless steel) 80 circulates around a pair of drums and 82 and 84 driven by conventional means (not shown). A backing table 86 underlies the uppermost/working portion of the belt and provides support therefor in the working region thereof where the electrode is formed. A first film-forming slurry 88 of lithium-intercalateable material is dispensed onto the belt 80 from a dispenser 90 having a slot at the mouth 92 thereof, like that described above in connection with FIGS. 1 and 2. The belt 80 carries the film-forming slurry 88 into a heated dryer 94 where evaporation of the solvent is accelerated, and the temperature of the film 88 is elevated (e.g., to about 50° C.). A strip of grid material 96 is fed into the dryer 94 prior to its being pressed into the warm film 88. The grid strip 96 will preferably be preheated (heating means not shown) to about 110° F. to about 130° F. before entering the dryer 94. A roller 98, having a tangential velocity equal to the linear velocity of the belt 80, presses the warm grid strip 96 into the warm film 88 as the belt 80 passes under the roller 98. Optionally, the roller 98 may also be heated.

After exiting from beneath the roller 98, the composite strip 100 advances beneath a second dispenser 102 (like in FIGS. 1 and 2) that dispenses a second film-forming slurry 104 atop the composite strip 100. From thence, the composite strip 100 advances into a dryer 106 for drying thereof of removing the remaining solvent therefrom. Thereafter, the composite strip 100 is ready for feeding directly into a cell assembly/laminating station, or for coiling up for storage and use at a later time.

Optionally, a strip of carrier material 108 (e.g., Mylar), unwound from reel 110 (shown in phantom), may first be laid atop the belt 80 and either (1) stripped from the composite material 100 after it exits the dryer 106, as shown in phantom at coil-up station 112, when the composite strip is fed directly into a cell assembly station, or (2) wound up, in jelly roll fashion, with the composite strip 100 on a reel (not shown) for storage and subsequent use, at which time the carrier strip 108 is peeled away from the composite strip 100. The carrier strip 108 serves not only to prevent the first film 88 from sticking to the belt, but for situation (2) immediately above, prevents the several turns of composite material 100 form sticking to each other in the jelly roll.

Individual cathode, anode and separator layers may be laminated together to form a complete cell. The cathode and anode electrode layers have been described above. The polymeric separator/membrane for the cell effectively forms a microporous sponge (i.e., ca. 30%–70% porous) for retaining electrolyte between the electrodes, and is made in a manner much like the electrodes are made, but from a slurry comprising the same binder, plasticizer and solvent as is used for making the electrodes. Optionally certain inorganic fillers such as fumed silica, fumed alumina or silanized fumed silica or other fillers may be added in small quantities (e.g., <about 7% by weight) to the organics to enhance the physical strength and melt viscosity of the separator/membrane and to increase the separator/membrane's ability to absorb electrolyte. One suitable separator/membrane mix comprises, on a weight basis, about 8.5% PVdF:HFP binder, 11.3% DBP plasticizer, and 73.3% acetone solvent. Other proportions of these materials are also known and useful. Like the electrode films, the membrane/separator films are made by spreading the slurry onto a suitable substrate, and driving off the solvent to dry the film.

After the laminate has been formed, it is immersed in a suitable solvent (e.g., diethyl ether, alcohols such as methanol, hydrocarbons such as pentane, etc.), or through $CO_2$ extraction, which selectively (i.e., does not dissolve the binder) leaches the plasticizer out of the electrodes and separator/membrane so as to leave a network of micropores pervading the electrodes and separator/membrane. The micropores are subsequently backfilled/impregnated with the battery's electrolyte which comprises an organic solution of a dissociable lithium salt. Any of a variety of electrolyte solutions may be used including such lithium salts as $LiClO_4$, $LiN(CF_3SO_2)_2$, $LiBF_4$, $LiCF_3SO_3$, $LiPF_6$ or $LiAsF_6$, dissolved in such organic solvents as dimethyl carbonate (DMC), ethylene carbonate (EC), diethoxyethane, diethyle carbonate, butylene carbonate and mixtures thereof. One such known electrolyte comprises about 0.5 to about 2 molar concentration of $LiPF_6$ in a mixed solvent comprising a mixture of ethylene carbonate and dimethyl carbonate.

Figure 4:
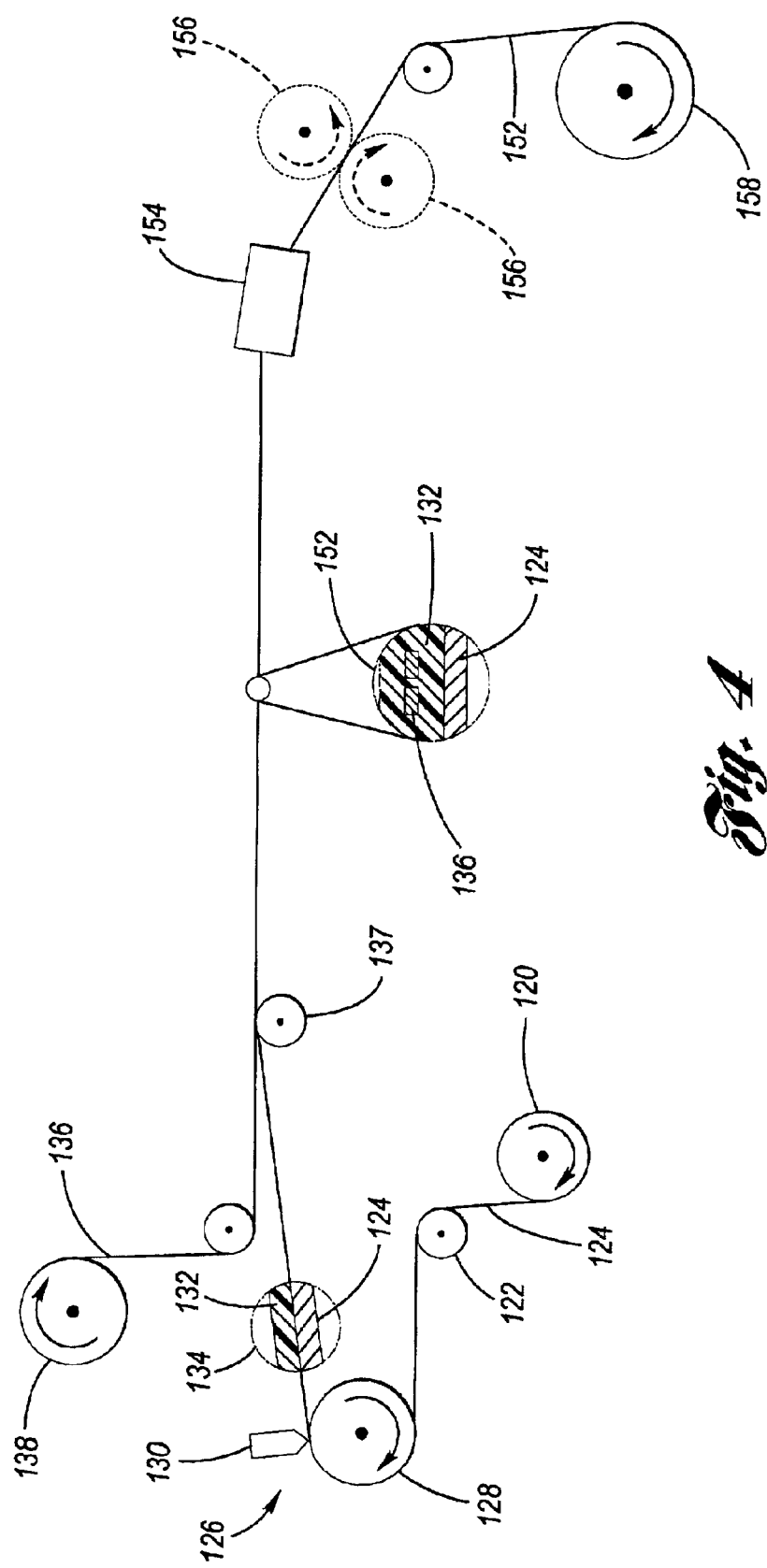
FIG. 4 is a schematic of still another embodiment of a process according to the present invention.
Figure 5:
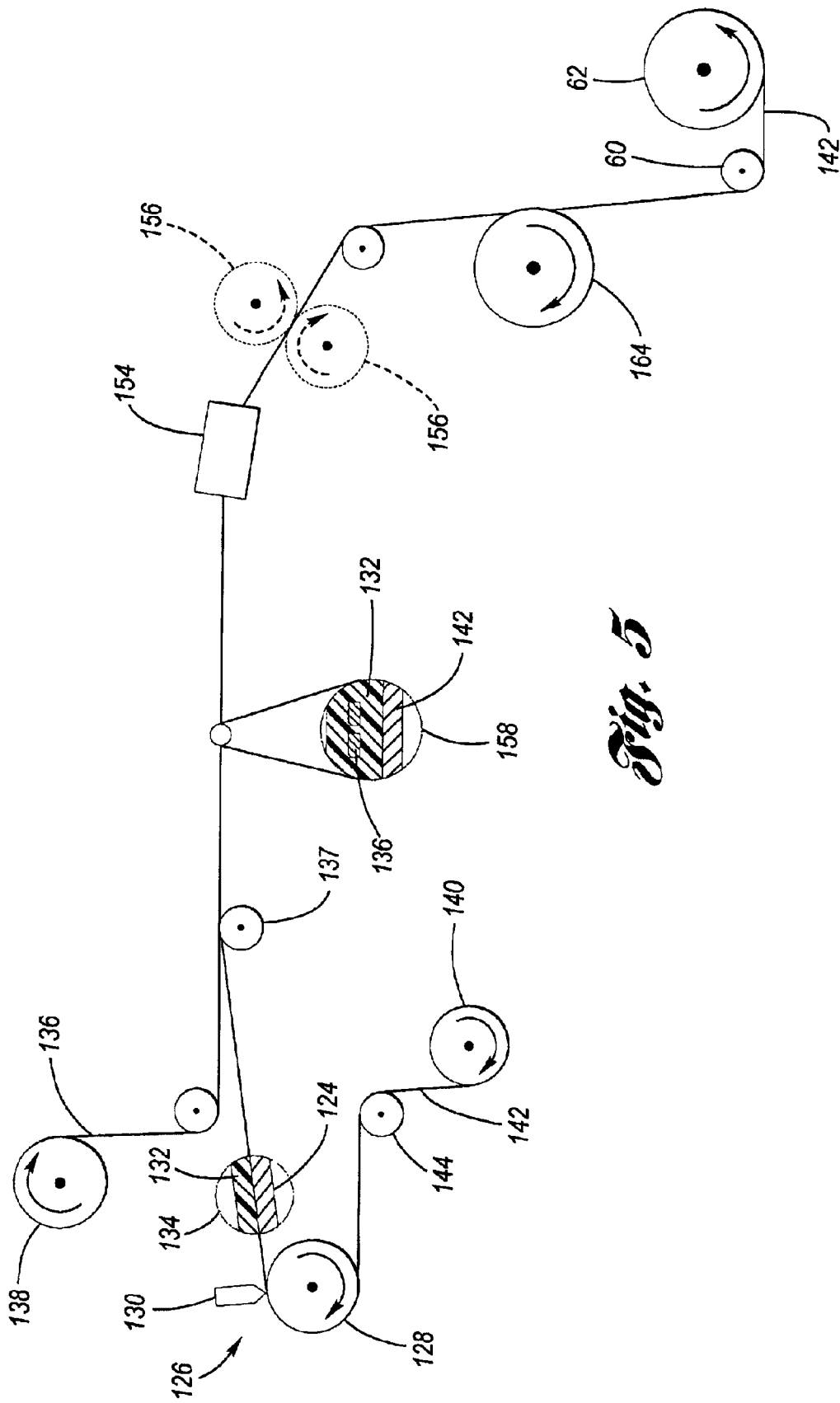
FIG. 5 is a schematic of still yet another embodiment of a process according to the present invention.
Figure 6:
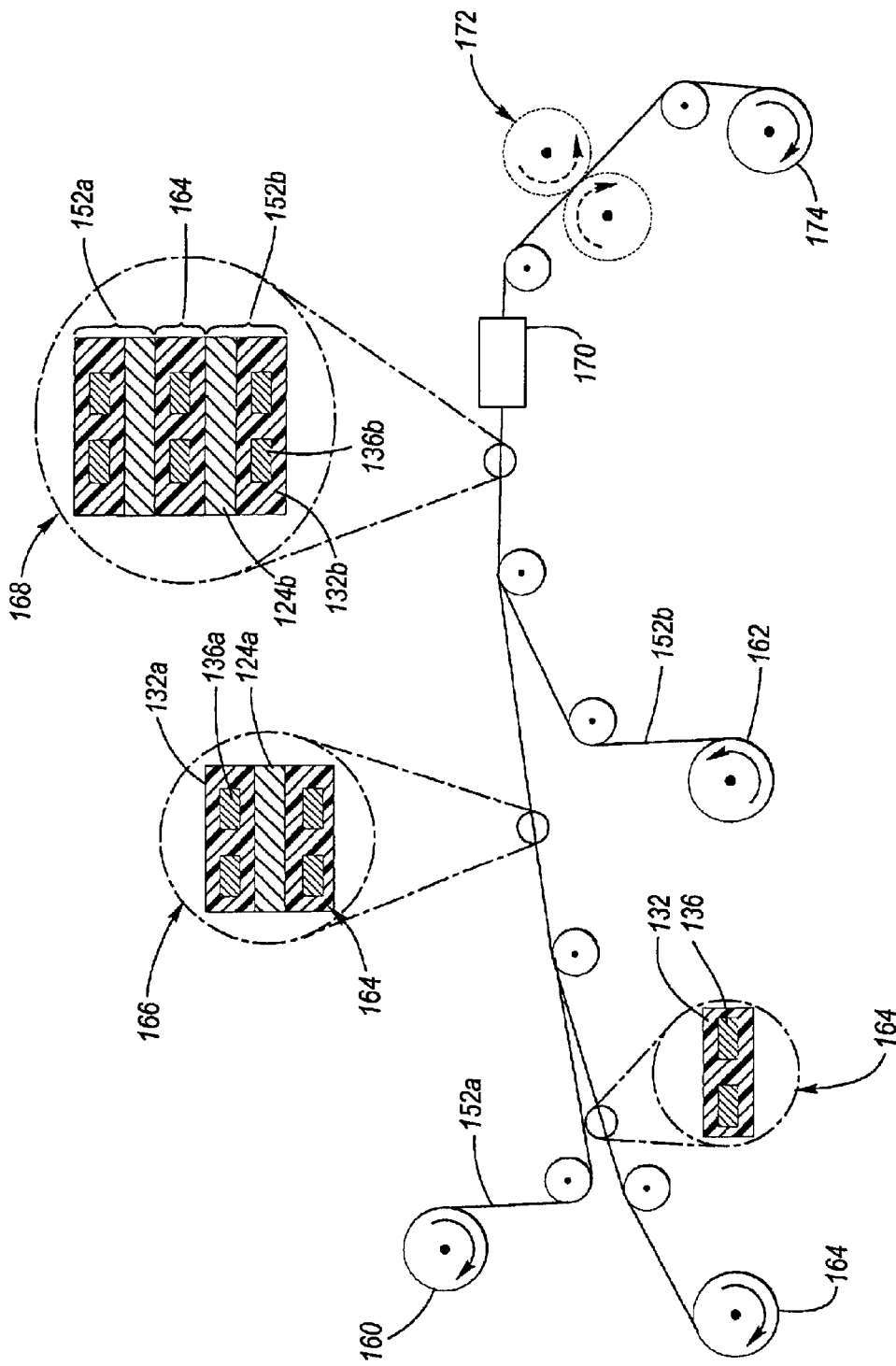
FIG. 6 is a schematic of a lamination embodiment according to the present invention.

FIG. 4 schematically depicts another embodiment of the present invention. Unless stated to the contrary, the process to be described in connection with FIGS. 4–6 is the same as described and illustrated in connection with FIGS. 1–2, except that a separator film is used in place of carrier 4. The separator defines a backing film, preferably polymeric. FIG. 4 shows a reel 120 having a polymeric backing film 124 wound thereon, hereinafter sometimes referred to as separator 124. In a preferred embodiment, separator 124 may comprise polyethylene material, polypropylene material, or a composite of both. Additionally, separator 124 is selected to have a thickness configured to match the thickness of the electrode formed thereon. In addition, separator 124 has a thickness selected to exhibit a strength suitable to be drawn through the various apparatus described and illustrated herein without mechanical failure or change in chemical properties, like carrier 4 in FIGS. 1–2. It will be appreciated that the thickness may vary as a function of the actual composition selected, having due regard for the selection criteria described above.

Separator 124 travels (i.e., is drawn towards) to a coating station 126, optionally via intermediate rollers, such as a roller 122 (only one shown) or other conventional carrying apparatus. Coating station 126 comprises a backing roller 128 and a dispenser 130. The separator 124 passes over backing roller 128 while a film-forming slurry 132 of lithium-intercalateable, film-forming material is spread onto the separator 124 from dispenser 132. The composition of the slurry is the same as described in connection with FIG. 1, as is the dispensing and spreading steps. A composite strip 134 is formed having a separator/film. A predetermined interval (e.g., 3 seconds) after the slurry has been deposited, and while still wet, an electrically conductive grid, expanded metal, perforated metal foil or the like is "bed-in" or dispensed in the slurry.

Thus, the composite strip 134 is advanced to a station where an electrically conductive grid 136 is disposed into the as yet still wet first film 132. The grid 136 is dispensed from a reel/roller 138. Roller 137 maintains tension in separator 124, sufficient in nature, so that grid 136 seeks a position intermediate in the slurry. That is, there is (in thickness) about as much slurry about grid 136 as there is below. Grid 136 may be the same as grid 20 in FIG. 1.

A composite strip 152 is thusly formed. Composite strip 152 includes separator/membrane strip 124, a first film 132, and grid 136. The composite strip 152 then passes through a dryer 154 (i.e., like that described in connection with FIG. 1) to dry first film 132 (i.e., remove the solvent from the binder/plasticizer slurry). The dryer 154, as well as the temperature ranges, drawing forces, and speed of movement may be the same as in FIG. 1. Significantly, the electrode is made by bedding in the grid while the slurry is still wet. This consolidation of individual steps, relative to the embodiment of FIG. 1, improves manufacturing speed and simplicity. Secondly, the separator 124 may be retained with the electrode just formed for later use (e.g, in producing a cell or bicell). This is also an improvement over the embodiment of FIG. 1, which uses a carrier film 4, which is eventually stripped off and discarded.

Thereafter, final composite strip 152 may be optionally calendered or rolled (see rollers 156 and 158) as discussed above in connection with FIG. 1. The electrode may be an anode or a cathode.

FIG. 5 is the same as FIG. 4, except that a reel 140 having a carrier 142 is used in place of separator 124. Carrier 142 may be the same as carrier 4, and may further include P.E.T. or paper. A roller 144 allows transport to coating station 126. A composite strip 148 is formed, which is the same as strip 152 except for the carrier/separator substitution mentioned above. In addition, the embodiment of FIG. 4 further includes a peeling station 60 and a reel 62 for peeling off carrier 142. The remaining electrode 164 is wound up for later use.

EXAMPLE

FIG. 6 shows the multi-layer fabrication process for a bicell. The process shown in FIG. 4 will be used to make two counter electrodes, for example, anodes, including a respective separator. The process shown in FIG. 5 will be used to fabricate a center electrode, such as a cathode, without a separator. FIG. 6 shows a first reel 160 having wound thereon a first strip having a first counter electrode corresponding in part to a first cell of the bicell, herein designated 152a (e.g., anode). FIG. 6 further shows a reel 162 having wound thereon a second strip having a second counter electrode corresponding in part to the second cell of the bicell, herein designated 152b (e.g., anode). Strips 152a and 152b may be that produced in the embodiment of FIG. 4 (i.e., including separator 124). FIG. 6 further shows a common or center electrode 164 of the bicell, which is shown wound on a reel. The common electrode may be an electrode produced according to the embodiment of FIG. 5. It should be appreciated that the embodiment shown in FIG. 6 is configured to produce a bicell 168 by laminating together the counter electrodes and the common electrode referred to above. However, bicell 168 according to the invention may be made using a continuous process similar to that shown and described in connection with the embodiment of FIG. 3.

Common electrode 164 is dispensed from the winding wheel. Strip 152a is dispensed from reel 160 and is laminated on to common electrode 164 such that separator strip 124a is in contact with film 132 of common electrode 164, forming an intermediate composite strip 166. Composite strip 152b is dispensed from reel 162 in such an orientation that it is laminated to intermediate strip 166 so that separator 124b of strip 152b is also in contact with film 132 of common electrode 164. Final composite strip 168 may be passed through a drier 170, having temperature ranges, and residency times as set forth above in connection with the embodiment of FIG. 1. The final composite strip (bicell) 168 may optionally calendered or rolled (see roller/reel 172, 174 in FIG. 6).

The final bicell laminate 168 may be immersed in a suitable solvent or through $CO_2$ extraction, which selectively leaches the plasticizer out of the electrodes and separator/membrane so as to leave a network of micropores pervading the electrodes and separator/membrane as discussed in more detail previously. The micropores may be subsequently backfilled/impregnated with the battery's electrolyte, as discussed in more detail previously. The bicell can be used to produce batteries, as known.

While the invention has been disclosed in terms of specific embodiments thereof, it is not intended to be limited thereto, but rather only to the extent set forth hereafter in the claims which follow.

What is claimed is:

1. A method of making lithium-intercalateable cells for a lithium-ion battery with polymeric separators comprising the steps of:
   (A) providing a polymeric backing defining a separator;
   (B) applying a film-forming slurry and an electrically-conductive grid onto said separator such that said grid is imbedded in said slurry, wherein said slurry comprises a plurality of lithium-intercalateable particles dispersed throughout a mixture that includes a polymeric binder compatible with said battery and a plasticizer for said binder; and
   (C) thereafter, drying said slurry, thereby forming a first electrode having said separator;
   (D) thereafter, drying said first electrode by removing said solvent;
   (E) removing said plasticizer from said binder so as to leave a network of pores pervading said binder;
   (F) backfilling said pores with a lithium-ion-conductive electrolyte;
   (G) applying a first film-forming slurry to a first face of an electrically-conductive grid, said slurry comprising a plurality of said lithium-intercalateable particles dispersed throughout a mixture including polymeric binder;
   (H) thereafter, drying the first film-forming slurry;
   (I) applying a second film-forming slurry to a second face of said electrically-conductive grid of (G), said slurry comprising a plurality of said lithium-intercalateable particles dispersed throughout a mixture including polymeric binder;
   (J) thereafter, drying said second-film forming slurry, thereby forming a second electrode with film on either side of said grid of (G); and
   (K) laminating said first electrode with separator to said second electrode of (J).

2. The method according to claim 1 including heating said electrode to effect said drying.

3. The method according to claim 2 including the step of pressing said first and second films together while said films are still warm from said heating.

4. A method of making lithium intercalateable bicells for a lithium ion battery with polymeric separators comprising the steps of:
   (A) applying a first film-forming slurry to a first face of an electrically-conductive grid, said slurry comprising a plurality of said lithium-intercalateable particles dispersed throughout a mixture including polymeric binder;
   (B) thereafter, drying the first film-forming slurry;
   (C) applying a second film-forming slurry to a second face of said electrically-conductive grid, said slurry comprising a plurality of said lithium-intercalateable particles dispersed throughout a mixture including polymeric binder;
   (D) thereafter, drying the second film-forming slurry, thereby forming an electrode with film on either side of grid;
   (E) providing a polymeric backing defining a separator;
   (F) applying a film-forming slurry and an electrically-conductive grid onto said separator of (E) such that said grid is imbedded in said slurry, wherein said slurry comprises a plurality of lithium-intercalateable particles dispersed throughout a mixture that includes a polymeric binder;
   (G) thereafter, drying said slurry of (F), thereby forming an electrode having said separator;
   (H) laminating a first side of the electrode of (D) to said electrode with separator of (G); and
   (I) laminating a second side of the electrode of (D) opposing said first side to a second said electrode with separator of (G).

5. The method of claim 4 further including the step of:
   forming the film-forming slurry to further include a plasticizer for the binder and a solvent, wherein the drying step comprising the substep of removing the solvent.

6. The method of claim 5 further comprising the step of removing said plasticizer so as to leave a network of pores pervading said binder.

7. The method of claim 6 further comprising the step of backfilling said pores with a lithium-ion-conductive electrolyte.

8. A method of making lithium-intercalateable electrodes for a lithium-ion battery with polymeric separators comprising the steps of:
   (A) providing a polymeric backing defining a separator;
   (B) simultaneously applying (i) a first film-forming slurry and an electrically-conductive grid onto a first face of said separator such that said grid is imbedded in said slurry, wherein said slurry comprises a plurality of lithium-intercalateable particles dispersed throughout a mixture that includes a polymeric binder compatible with said battery and a plasticizer for said binder; and (ii) a second film-forming slurry onto a second face of said separator opposite said first face, wherein said slurry comprises a plurality of said lithium-intercalateable particles dispersed throughout a mixture of said binder, said plasticizer and a solvent for said binder;
   (C) thereafter, drying said electrode by removing said solvent to form respective first and second films;
   (D) removing said plasticizer from said binder so as to leave a network of pores pervading said binder; and
   (E) backfilling said pores with a lithium-ion-conductive electrolyte.

9. The method according to claim 8 including heating said electrode to effect said drying.

10. The method according to claim 9 including the step of pressing said first and second films together while said films are still warm from said heating.

* * * * *